Dec. 23, 1941.   T. ZIMMERMAN ET AL   2,267,229
METHOD OF FORMING ROLLER BEARING CUPS
Filed May 12, 1939   2 Sheets-Sheet 1
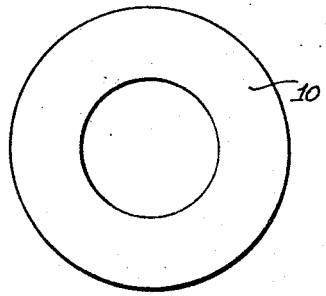
Fig. 1.
Fig. 2.
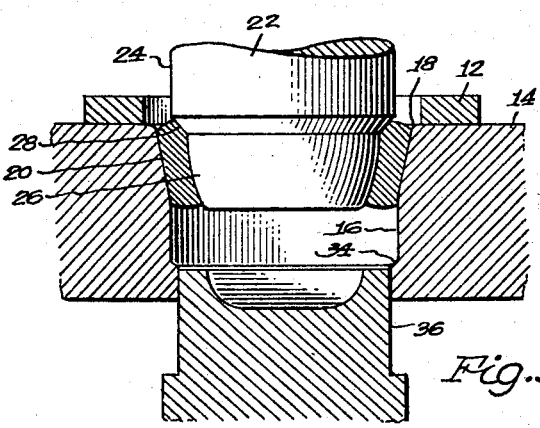
Fig. 5.
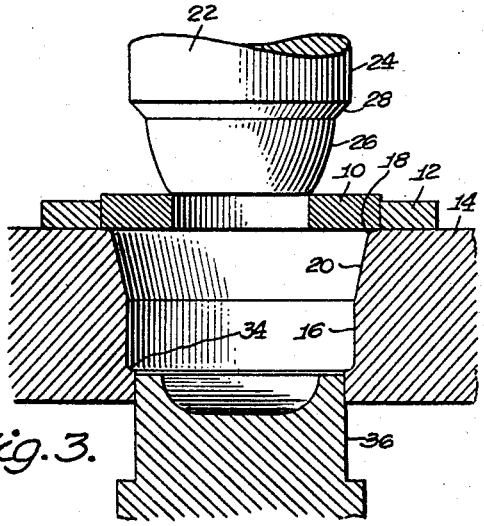
Fig. 3.
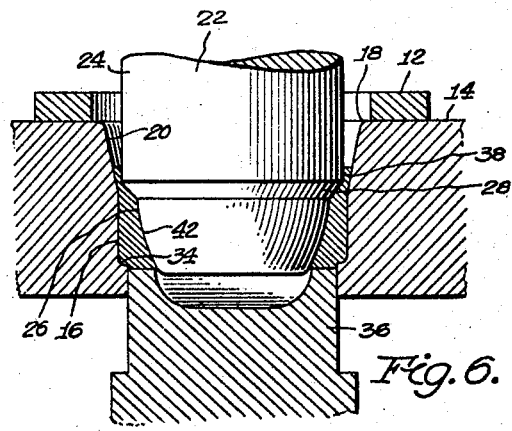
Fig. 6.
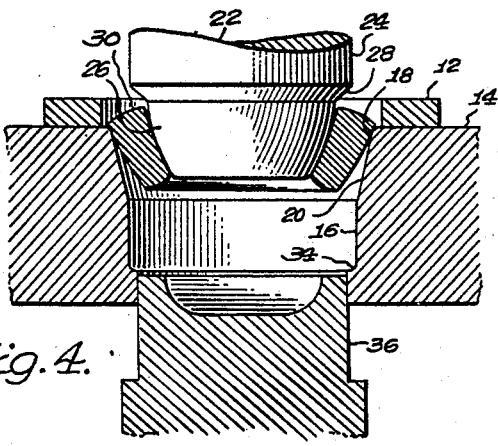
Fig. 4.
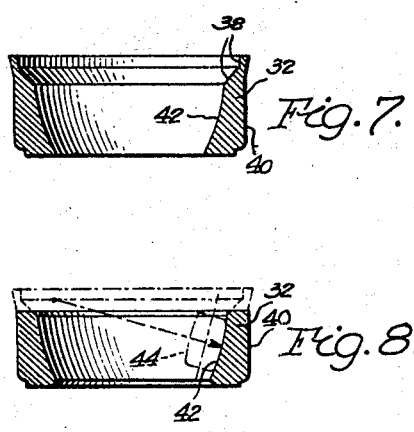
Fig. 7.
Fig. 8.
Inventor
Thomas Zimmerman,
Albert J. Schreiber,
By
Attorneys Dec. 23, 1941.  T. ZIMMERMAN ET AL  2,267,229
METHOD OF FORMING ROLLER BEARING CUPS
Filed May 12, 1939  2 Sheets-Sheet 2
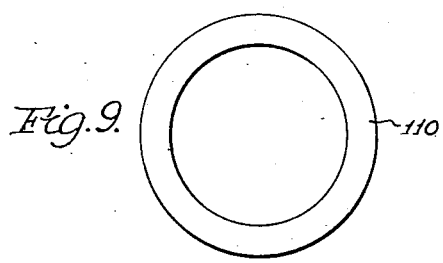
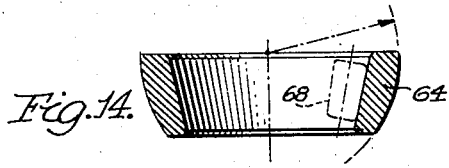
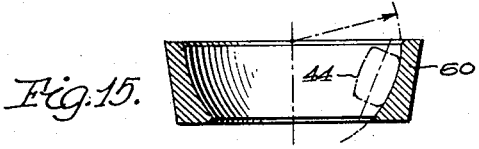
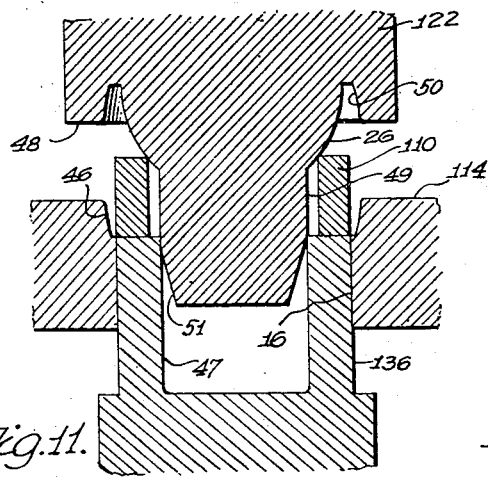
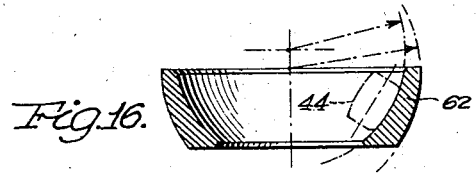
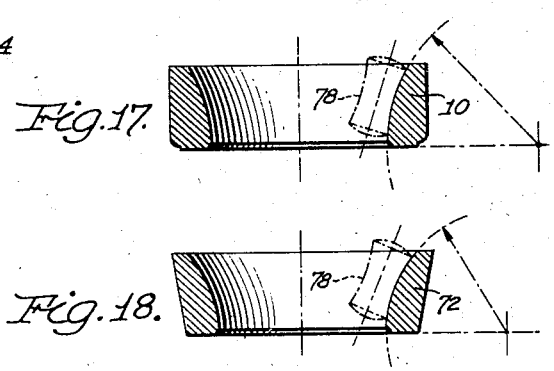
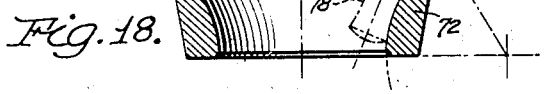
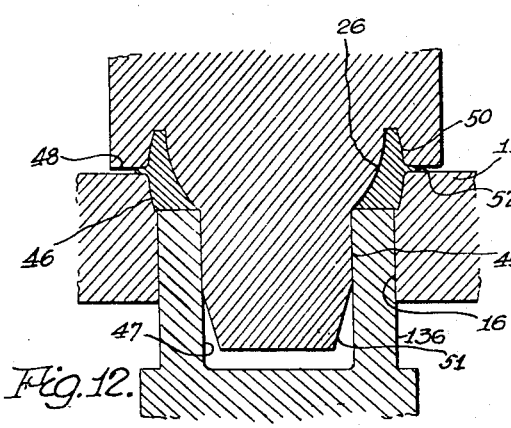
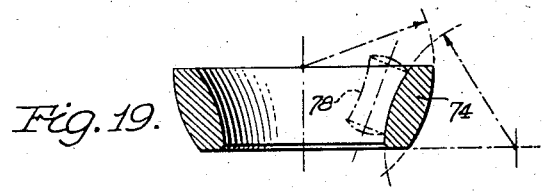
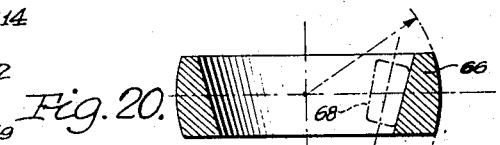
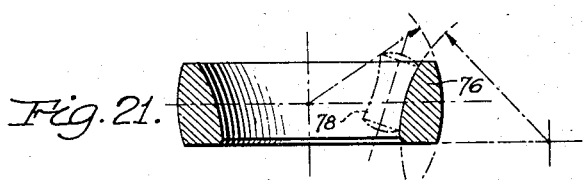
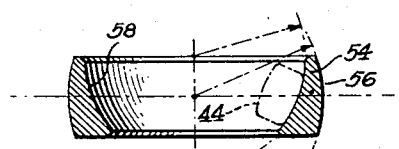
Inventor
Thomas Zimmerman,
Albert J. Schreiber,
By
Attorneys Patented Dec. 23, 1941

2,267,229

UNITED STATES PATENT OFFICE 2,267,229

METHOD OF FORMING ROLLER BEARING CUPS

Thomas Zimmerman and Albert J. Schreiber, Detroit, Mich., assignor to Bower Roller Bearing Company, Detroit, Mich., a corporation of Michigan Application May 12, 1939, Serial No. 273,306

1 Claim. (Cl. 29—148.4)

This invention relates, in general, to roller bearing cup members and, in particular, to a new and improved method of making same.

One of the objects of this invention is to improve the method of making roller bearing cup members so that said members may be made more easily and with less cost than heretofore, and so that said members may have bearing surfaces of desired contour and a more favorable texture throughout.

Another object is to provide an improved method of making roller bearing cup members whereby the choice of bearing surfaces is given a much greater range than heretofore.

Other objects and advantages of the invention will become readily apparent from a reference to the following specification taken in conjunction with the accompanying drawings, of which there are two (2) sheets and wherein:

Figure 1 is a plan view of a blank suitable for use in connection with a process embodying the present invention;

Fig. 2 is an edge view, in section, of the blank shown in Fig. 1;

Fig. 3 is a sectional view of a die with the blank shown in section and in place thereon, together with a punch shown in elevation, to illustrate the present process or method and to show the position of the parts at the beginning of the forming operation;

Figs. 4, 5 and 6 are sectional views similar to Fig. 3 and illustrating succeeding steps in the process;

Fig. 7 is a vertical section of the cup at the end of the step in the forming process shown in Fig. 6;

Fig. 8 is a view similar to Fig. 7 but showing the finished cup after the portion shown in dotted lines will have been removed by a machining operation;

Figs. 9 and 10 are views similar to Figs. 1 and 2 of a blank of slightly modified form which may be employed in the present process;

Figs. 11 and 12 are sectional views of a modified form of die and a modified form of punch, with the blank of Fig. 10 in place therebetween, illustrating successive steps of the process of forming said blank into cup form;

Fig. 13 is a vertical section of the finished cup, after the necessary machining operations have been performed thereon, formed at the end of the step of the process shown in Fig. 12, and showing in dotted lines in proper positioning with respect thereto the appropriate roller adapted therefor; and Figs. 14 through 21 are vertical sections of still further modified cup forms, and each showing in dotted lines and in proper positioning with respect thereto the roller best adapted therefor.

In the first herein disclosed cup-forming process an annular blank 10 is employed, see Figs. 1, 2 and 3, the external diameter of which blank being slightly greater than the desired external diameter of the finished cup to be formed therefrom. Blank 10 is preferably struck from a blank sheet of metal and its displaced center piece is, therefore, in such condition as to warrant its use as a blank for a cup of lesser dimensions than those of the cup to be made from blank 10, thereby effectuating a saving in blank stock in the cup-forming process in general.

As shown in Fig. 3, blank 10 is placed within a centering member 12 which is secured onto a die block 14, said member holding said blank in coaxial alignment with a bore 16 formed in said block, the lower peripheral edge of said blank resting upon the top of said block immediately adjacent the upper edge 18 of the upwardly diverging portion 20 of said bore. The taper of the portion 20 of the bore 16 is slight and, therefore, the external diameter of the blank 10 need be but little greater than the diameter of the cylindrical portion of said bore, said cylindrical portion determining the outer diameter of the cup member to be formed in the die block 14 by the descent of a punch 22.

Punch 22 is operated in any well known manner and at desired intervals either manually or automatically and is formed at its upper end with a cylindrical portion 24 having a diameter slightly less than that of the cylindrical portion of the bore 16 in the die block 14 and at its lower end with a convex portion 26 the surface of which is preferably tapered in a generally downward direction and set off about vertical and horizontal axes and which surface may be spherical. The portions 24 and 26 of punch 22 merge into an intermediate downwardly inclined shoulder portion 28, the upper horizontal diameter of convex portion 26 being considerably less than the diameter of the cylindrical portion 24 and less than the smallest diameter of the bore 16—20, there being left, therefore, a space between the punch 22 and the wall of the cylindrical portion of bore 16 when the punch has descended into the bore, and this space represents the thickness of the cup to be formed therein while the outer surface and the inner raceway of said cup will be formed by the cylindrical surface of the bore

16 and the convex surface 26 of the punch 22, respectively.

As shown in Fig. 4, the punch 22, in descending from the position shown in Fig. 3, depresses the central portion of the blank 10 and said blank is caused to turn about the upper edge 18 of the upper portion 20 of the bore 16 into the form of a ring 30, this step, which might be designated as that step which turns the blank inside out, being the first step of the forming operation. This step but slightly decreases the external diameter of the blank but does, in depressing the central portion thereof, expand or stretch the metal from the central opening therein outwardly. As the punch 22 continues downwardly from the position shown in Fig. 4 to that shown in Fig. 5, the shoulder 28 thereon comes into contact with the upper annular edge of the ring 30, thereby forcing said ring downwardly with said punch beyond the tapered portion 20 of the bore 16 into the cylindrical portion of said bore, as shown in Fig. 6, thus re-shaping the ring into its new cup form 32. The downward travel of the punch 22 from the position shown in Fig. 4 to that shown in Fig. 6 draws and compacts the metal and elongates the ring from the form 30 to the cup form 32 in the direction of its longitudinal width, such drawing action taking all tension out of the metal, compacting it and otherwise putting it into the best possible condition for use with a roller bearing of the barrel type and eliminating flaws from the body and its surfaces and other tendencies to crack.

The end of the step of the process represented in Fig. 6 forms the bottom wall of the cup 32 into desired peripheral shape and planar shape by forcing said cup simultaneously against a collar formation 34 in the lower end of the bore 16 and against the upper planar end of a plug 36, said plug being employed for closing the bottom end of the bore 16, cupped to permit the extreme lower end of the plunger 22 to be received therein at the end of the plunger stroke, and movable upwardly to remove the formed cup from said bore when desired.

In advancing the punch 22 to the end of its working stroke, the shoulder 28 forces any excess metal to flow upwardly between the cylindrical portion 24 of said punch and the wall of the bore 16, and this excess metal, shown at 28 in Figs. 6 and 7, is removed by any simple and well known machining operation so as to present the cup 32 in the form shown in Fig. 8.

The metal drawing operation or steps of the process which take place when the partly formed cup member is forced downwardly in the die block bore 16 in contact with the tapered portion 20 and cylindrical portion thereof produce an exceptionally smooth external surface 40, and the cylindrical portion of said bore forms this surface exactly parallel with the axis of the cup 32, as is desired in this particular process. The convex portion 26 of the punch 22 confines the metal between it and the wall of the bore 16, and the drawing action which takes place during the punch descent causes the cup member to conform accurately to the convexity of said punch and acquire an exceptionally compact body and smooth internal surface, or inner raceway 42, which raceway is that desired for accommodating a barrel-type roller such as that shown in dotted lines at 44. Little or no internal boring of the cup 32 is necessary to reduce the raceway 42 to its desired size, and little or no external grinding of the surface 40 is necessary to reduce it to its desired diameter, and this raceway and surface remain as formed because the tendency of the cup 32 to expand or contract after removal from the block 14 has been eliminated by the drawing and compacting of the metal during the forming operation.

In addition to the aforementioned machining operation which is quite necessary for the removal of the flash 38 and which is indicated in dotted lines in Fig. 8, it may be desirable to hone the inner raceway 42, though, as has been pointed out, grinding of said raceway will be found absolutely unnecessary.

It will be noted that the finished cup 32 shown in Fig. 8 has a cylindrical outer surface 40 and a concave or spherical downwardly converging inner raceway 42, that said raceway is shown as being curved about horizontal and vertical axes to render it downwardly converging as well as concave, that tangents drawn at the upper end of said raceway will be either parallel or downwardly converging, and that the center or centers of curvature of said raceway lie either at or above the plane of the top surface of said cup.

In Figs. 9, 10 and 11 there is shown an annular blank 110 which may very well be the blank punched from the center of blank 10 or which may be any other blank of annular form from which it is desired to make a bearing cup member. The forming process which is to be performed on blank 110 is, as will be seen, slightly different from the process already described and performed on blank 10, the chief difference being that in the process to be described there is no step of turning the blank inside out, as shown in Fig. 4.

A die block 114 is provided and is similar to block 14 in that it is formed with a cylindrical bore 16 but is dissimilar therefrom in that it is formed with a communicating, downwardly converging, concave or spherical bore 46, said bore 16 in said block 114 receiving a plug 136 which is dissimilar from plug 36 in that it is formed with a cylindrical socket 47 and in that said plug 136 serves as a support for the work piece from the beginning to the end of the forming process. It will be noted that tangents drawn at the upper end of the bore 46 will be vertical and parallel, this meaning that the center or centers of curvature of said bore lie in the plane of the upper surface of the block 114 and preferably, but not necessarily so, on the central axis of said bore.

A punch 122, similar to punch 22 in the provision of the convex portion 26, is provided with a downwardly projecting, annular shoulder portion 48 which, upon the arrival of said punch at its lowermost position, is in substantial co-operation with the upper surface of the block 114 adjacent and outwardly of the bore 46 in said block. The shoulder portion 48 of the punch 122 has an inner wall 50 spaced from the convex portion 26 and which is upwardly converging and concave and which cooperates with the bore 46 in the block 114, when the punch is in its lowermost position, to provide a continuous spherical surface with its central axis coincident with the coaxial axes of the bore 46 and punch 122 and with its median plane coincident with a plane lying between and equidistant from the opposing surfaces of the block 114 and shoulder portion 48. This spherical surface formed by the cooperation of the surfaces 46 and 50 has that diameter which is desired for the outer diameter of the cup to be formed and that concavity which will give to the external surface of said cup the desired convexity. The portion 26 of punch 122 has that convexity which will give to the internal surface of the cup the desired concavity. The space between the convex portion 26 and the walls 46 and 50, as shown in Fig. 12, represents that thickness, graduated from top to bottom as shown, which is desired for the cup. The annular width of the space between the convex portion 26 and the wall 50 of the punch 122, at the plane of the shoulder 48, should be sufficient to permit the entrance therethrough of the blank 110 after said punch has descended to a position whereat said plane and the plane of the upper surface of said blank are coincident. By the time these planes become coincident, it is to be understood that the annular thickness of the blank will have become less than that shown in Fig. 12 because of the expansion thereof caused by the convex portion 26 of the punch 122.

The punch 122, in addition and as distinguished from punch 22, has a cylindrical portion 49 integral and coaxial with the convex portion 26, and has also a conical portion 51 integral and coaxial with said cylindrical portion 49. The diameter of portion 49 is less than the inner diameter of the blank 110 and just slightly less than the diameter of the bore 47 so that said portion 49 can pass through said blank into said bore during the descent of the punch 122 and so that none of the metal of said blank can flow between the walls of said bore and said portion 49 during the forming of the desired cup. The portion 51, on the other hand, is provided simply to assure a proper position of the blank 110 with respect to the punch 122 upon the initiation of punch descent, and it will be noted in Fig. 12 that the base of said portion 51, when said punch is at the end of its descent, is spaced from the base of the bore 47 so as to assure the proper relative positioning at that time of said punch, the block 114 and the plug 136.

As shown in Fig. 11, the blank 110 is placed in the bore portion 46 on the top of plug 136, the external diameter of said blank being slightly less than the smallest diameter of said portion so that the lower edge of said blank lies substantially below the upper surface of the block 114. The blank 110 is thus centered in the bore portion 46 with respect to the convex portion 26 of the punch 122 and a substantial portion of the blank body lies above the block 114. It will be noted that the inner diameter of the blank 110 is slightly greater than the diameter of the lower end of the convex portion 26 so as to receive the latter therein at the beginning of the punch descent.

As the punch 122 descends from the position shown in Fig. 11, the blank 110 is simultaneously expanded by the convex portion 26 and compressed by the downward force of the punch, the form assumed by the flowing metal upon the termination of the punch descent being shown in Fig. 12. There is bound to be excess metal and this excess metal, shown at 52, will be found to have flowed between the block 114 and shoulder portion 48, and this flash 52 may be removed from the cup surface by any ordinary machining operation upon the removal of the formed cup from said block by an upward movement of the plug 136. The resulting cup 54 has a spherical or convex outer surface 56 and a spherical or concave inner raceway 58, the latter possibly requiring a honing operation to obtain the highest of finished surfaces for accommodating the barrel-type roller 44 but not requiring a grinding operation. It will be noted that the surface 56 and raceway 58 of the finished cup 54 are curved about vertically spaced centers, these centers lying on the axis of the cup and the lower thereof lying in the horizontal median plane through said cup.

The blank 110, like the blank 10, is thus formed by a drawing and compressing or compacting action into the desired cup form so as to require a practically negligible amount of machining to obtain the required dimensions and cross sectional form. The metal is so changed in its texture that tendencies to crack, split or disintegrate are eliminated. The resulting surfaces are smooth and of long-wearing qualities, the body is compact and accurately dimensioned, and the dimensions will remain as formed.

Though two types of cup members have been discussed along with their processes of formation, each being adapted for entertaining a barrel-type roller and one having a cylindrical outer surface while the other has a spherical outer surface, other types may be formed and some of these appear in Figs. 14 through 21. It is believed that the information so far disclosed will enable persons skilled in the art to form any or all of the cup members shown in Figs. 14 through 21 by slightly modifying the apparatus in accordance with the cup form desired.

In Figs. 15 and 16, for instance, a pair of cup members 60 and 62 is shown and each has a spherical or concave inner raceway substantially similar to the raceways 42 and 58 of cups 32 and 54 for accommodating the barrel-type roller 44, the cup 60 of Fig. 15 having a downwardly tapered external surface, as distinguished from the cups 32 and 54, and the cup 62 of Fig. 16 having a spherical external surface similar to the lower half of the surface 56 of cup member 54. It will be noted that the inner raceways of cups 60 and 62 are curved about centers lying on the axes of said cups, as in the case of cup 54 and as distinguished from the case of cup 32, and that the outer surface of the cup 62 is curved about a center lying below the center of the inner surface, as in the case of cup 54.

In Figs. 14 and 20, a pair of cup members 64 and 66 is shown and each has a downwardly tapered inner raceway for accommodating a conical or tapered roller 68, the cup 64 of Fig. 14 having a spherical external surface similar to that of cup 62, and the cup 66 of Fig. 20 having a spherical external surface similar to that of cup 54. It will be noted that these external surfaces of cups 64 and 66 are curved about centers lying on the axes of said cups, just as in the case of cup 54.

In Figs. 17, 18, 19 and 21, a plurality of cup members 70, 72, 74 and 76 is shown and each has a convex inner raceway for accommodating a concave roller 78, the cup 70 of Fig. 17 having an external cylindrical surface similar to that of cup 32, the cup 72 of Fig. 18 having a downwardly tapered external surface similar to that of cup 60, the cup 74 of Fig. 19 having a spherical external surface similar to those of cups 62 and 64, and the cup 76 of Fig. 21 having a spherical external surface similar to those of cups 54 and 20. It will be noted that the external surfaces of cups 74 and 76 are curved about centers lying on the axes of said cups, and that the inner raceways of cups 70, 72, 74 and 76 are curved about centers lying without said cups and preferably on the planes of their lower surfaces.

Although the invention has been described with some detail it is not intended that such description is to be definitive of the limits of the inventive idea. The right is reserved to make such changes as will come within the purview of the attached claim.

What we claim is:

The method of forming an annular roller bearing member which includes, positioning the lower end of an annular metallic blank of predetermined diameters on the upper end of an annular support having an inner diameter less than the inner diameter of said blank and an upper portion surrounding but spaced from the outer surface of the lower half of said blank, forcing a tool having an upwardly diverging working surface downwardly against the upper inner edge of said blank and along the inner surface thereof to upset by cold working the metal therein and provide said inner surface with the shape desired therefor, projecting a second tool ahead of said first-named tool through said support to opposed contraction of the metal in said lower half of said blank beyond a position corresponding to the inner circumference of said support during travel of said first-named tool toward the end of its stroke, said upper portion of said support the while opposing expansion therebeyond of the metal in said lower half of said blank, and applying pressure during said tool travel to the upper end and upper outer edge of said blank to further upset by cold working the metal therein and provide the outer surface of the upper half of said blank with the shape desired therefor and to effectuate contraction and expansion of said lower half of said blank to the limits determined therefor by said second-named tool and said upper portion of said support.

THOMAS ZIMMERMAN.
ALBERT J. SCHREIBER.